United States Patent [19]
Miczek

[11] 3,990,870
[45] Nov. 9, 1976

[54] MEANS AND METHOD FOR SEPARATING AND COLLECTING PARTICULATE MATTER FROM A GAS FLOW

[76] Inventor: Gerhard Miczek, Apartment No. 4, 1501 Cowling Ave., Louisville, Ky. 40205

[22] Filed: Oct. 17, 1974

[21] Appl. No.: 515,607

Related U.S. Application Data
[63] Continuation of Ser. No. 295,294, Oct. 5, 1972, abandoned.

[52] U.S. Cl. ............................... 55/92; 55/93; 55/223; 55/226; 55/236; 55/238; 55/241; 55/242; 55/445; 55/456; 55/459 D; 261/79 A; 261/109; 261/112
[51] Int. Cl.² .................................. B01D 47/06
[58] Field of Search ............... 55/92, 94, 236–238, 55/240–242, 260, 445, 456, 459, 223, 226, 93; 261/79 A, 109, 112

[56] References Cited
UNITED STATES PATENTS

| | | | |
|---|---|---|---|
| 841,674 | 1/1907 | Dodge | 55/240 X |
| 1,783,813 | 12/1930 | Schneible | 55/238 |
| 2,226,127 | 12/1940 | Harmon | 55/237 X |
| 2,252,581 | 8/1941 | Saint-Jacques | 55/459 X |
| 2,354,674 | 8/1944 | Fisher | 55/238 X |
| 3,233,882 | 2/1966 | Calaceto | 55/238 X |
| 3,323,290 | 6/1967 | Stern | 55/92 |
| 3,678,659 | 7/1972 | Schouw | 55/238 |

FOREIGN PATENTS OR APPLICATIONS
| | | | |
|---|---|---|---|
| 749,038 | 7/1933 | France | 55/459 |

*Primary Examiner*—Frank W. Lutter
*Assistant Examiner*—Kathleen J. Prunner
*Attorney, Agent, or Firm*—George C. Atwell

[57] ABSTRACT

Apparatus is disclosed for achieving separation of particulate matter from a gas flow by interacting the gas flow with a water curtain within a contacting chamber. The gas flow enters the contacting chamber tangentially near the bottom thereof whereby it tends to spiral upwardly toward an exhaust opening at the top of the chamber. Means are provided to form a water curtain across the passage through which the gas flow enters the chamber whereby particulate matter such as dust carried in the gas flow is entrained by water droplets thereof. Above the area of the gas flow inlet passage, spaced-apart ring-like members are provided for disrupting the upwardly spiraling gas flow and forcing the flow away from the chamber's side wall. A chamber rinsing means is provided adjacent the upper end of the chamber for directing a rinsing water flow downwardly against the chamber side wall in a spiral flow countercurrent to the gas flow. Still another water inlet means may be provided at a central location in the chamber above the level of the gas inlet passage to direct a downward axial water spray in the direction of the lower end of the chamber. The chamber has a discharge opening at its lower end for discharging water with the collected particulate matter separated from the gas flow.

5 Claims, 4 Drawing Figures

MEANS AND METHOD FOR SEPARATING AND COLLECTING PARTICULATE MATTER FROM A GAS FLOW

This is a continuation of application Ser. No. 295,294, filed Oct. 5, 1972, and now abandoned.

BACKGROUND OF THE INVENTION

This invention relates generally to means and method for accomplishing the separation of particulate matter such as dust from industrial gases and, more specifically, it pertains to collecting particulate matter from a gas flow through the use of a contacting chamber wherein the gas flow is subjected to a continuing flow of water.

Apparatus has been previously disclosed for cleaning industrial gases and collecting particulate matter therefrom wherein the particle-laden gas flow is centrifugally whirled through a contacting chamber through a dense flow of water droplets directed across or against the flow direction of the gas being cleaned.

A typical example of such apparatus includes a vertically elongated contacting chamber wherein the gas flow is directed to the chamber through an inlet transverse to the axis of the chamber and tangentially oriented such that the gas moves upwardly through the chamber in a spiral pathway toward an outlet tube thereabove. Water is directed downwardly through the contacting chamber generally from the upper end thereof and the process of separating particulate matter from the gas flow takes place substantially in the portion of the chamber adjacent the tangential gas inlet. Here a curtain of water droplets is established and the particulate matter is collected on the surface of the water droplets.

The particles of matter and the water droplets are continuously driven by centrifugal force against the inside chamber surface where both tend to collect and form a water layer or sheet containing captured particles therein. This particle-laden layer, now speared from the gas flow, progresses downwardly toward the discharge opening.

It is well known that in a given contacting chamber of fixed diameter the increase of the velocity of the gas flow in the tangential inlet causes a corresponding increase in the centrifugal force of the gas flow moving upwardly through the chamber. It has been determined that the effectiveness of the centrifugal force and the water curtain and the water droplets thereof within the chamber will increase as a function of increased gas flow velocity through the tangential inlet. Although the efficiency of such apparatus can be enchanced by increasing the velocity of the gas flow coming into the chamber, such increase in velocity for a substantially unchanging gas flow rate has a detrimental effect on the downwardly directed water flow along the inside surface of the chamber. The increased velocity generates a turbulence upon the water flow moving downwardly on the inside surface of the chamber and an increased upward traction, preventing the desired comparatively smooth descending water flow pattern. Instead, the water is held back and accumulated in the general area of the chamber above the tangential gas inlet such that the downward water flow becomes intermittent. The water in this part of the chamber must then accumulate to form a certain mass whereby it will overcome the force of the rising gas flow before continuing its downward movement. This reaction to the water flow in response to the increased gas flow velocity results in unpredictable fluctuations in pressure within the chamber and in a reduction of separation efficiency. Such a reaction can also cause objectionable vibrations of the entire apparatus.

SUMMARY OF THE INVENTION

This invention comprehends a solution to the foregoing problem by provision of a method and apparatus for disrupting the pathway of the upwardly spiraling gas flow whereby the gas flow is caused to move inwardly away from the chamber side wall in the area above the tangential gas inlet whereby water descending through the chamber can continue in a relatively smooth and uninterrupted manner despite the presence of a relatively high velocity countercurrent ascending gas flow therethrough.

The apparatus of the present invention includes a tubular casing defining an interior contacting chamber that is empty or substantially vacant of any internal structure except for a means for interfering with upward gas flow, the particular function of which is hereinafter described. The major axis of the chamber is substantially vertically oriented. A gas flow inlet means is provided adjacent the lower end of the chamber including a gas inlet passage in the chamber side wall and a gas flow conduit disposed in flow communication with the gas inlet passage. The gas flow conduit is tangentially oriented to direct the gas flow through the gas inlet passage toward the chamber side wall portion laterally adjacent thereto whereby the gas flow will then move toward a gas flow outlet opening in the upper end of the chamber in an ascending spiral pathway against the chamber side wall.

The presently preferred embodiment of the present invention further includes a water inlet means adjacent the gas inlet passage that is adapted to provide a water curtain across the passage. The chamber has interference means located above the gas inlet passage for disrupting and breaking up the ascending gas flow. This interference means preferably includes a plurality of ring-like members disposed in a vertically spaced-apart relation. Each of the ring-like members is preferably configured to be generally planar in cross section and has an outer edge disposed contiguous to the inside surface of the chamber. As hereafter described in greater detail, a continuous annular configuration for the ring-like members is purposely avoided and several different forms for the ring-like members may be utilized to obtain the desired effect within the chamber as heretofore described.

DETAILED DESCRIPTION OF THE PREFERRED EMBODIMENTS

Figure 1:
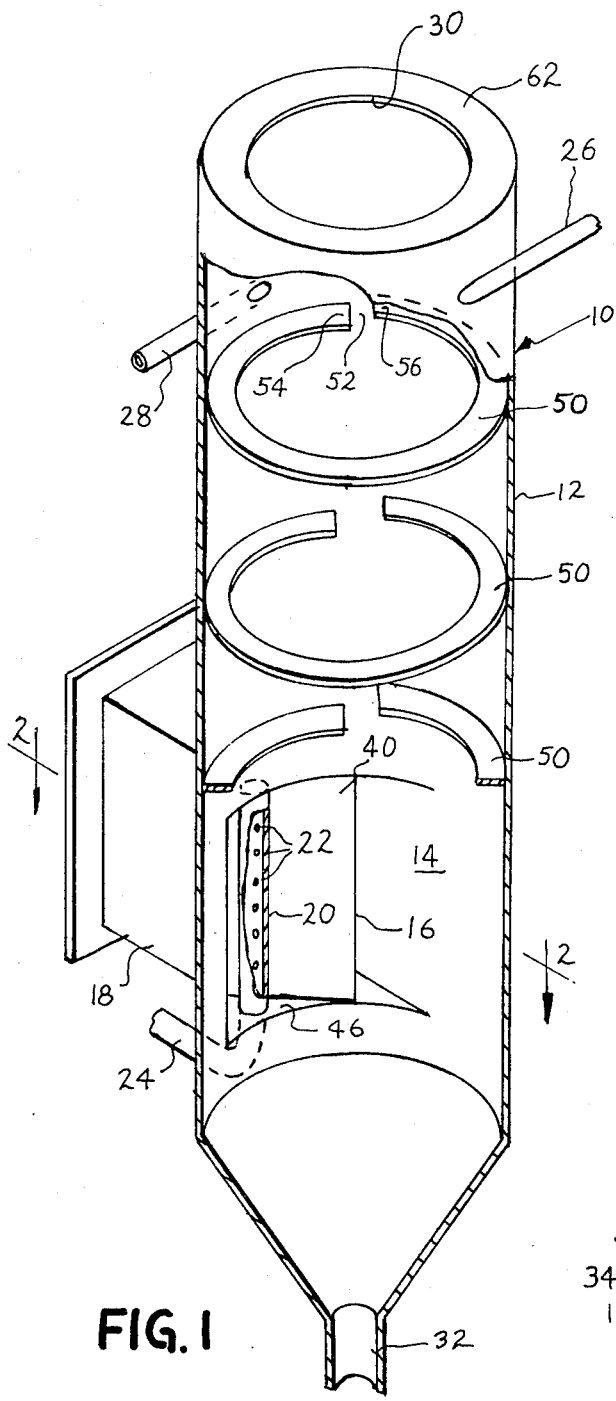
FIG. 1 is an isometric view of apparatus in accordance with the present invention, having a portion thereof cut away to reveal the internal components thereof and their respective dispositions.

As shown in FIG. 1, the present invention utilizes a contacting apparatus 10 comprising a casing 12 defining an internal contacting chamber 14 having its major axis threof oriented substantially vertically. Gas flow inlet means to the chamber is located adjacent the lower end thereof and includes a gas inlet passage 16 having a gas flow conduit 18 disposed in flow communication therewith. Adjacent the gas inlet passage 16 and laterally disposed therefrom is a water inlet means including a vertically oriented tube 20 having vertically spaced-apart discharge holes or nozzles 22 provided therein. A tube 24 is disposed below the conduit 18 and is connected in water flow communication with the tube 20 to provide a continuous water flow therethrough. Rinse means is provided for the apparatus including rinse water inlet tubes 26 and 28 disposed adjacent the upper end of the casing 12. The top of the casing is provided with a substantially large centrally located gas exhaust opening 30, and the lower end of the casing 12 tapers inwardly to the water and particle discharge opening 32.

Figure 2:
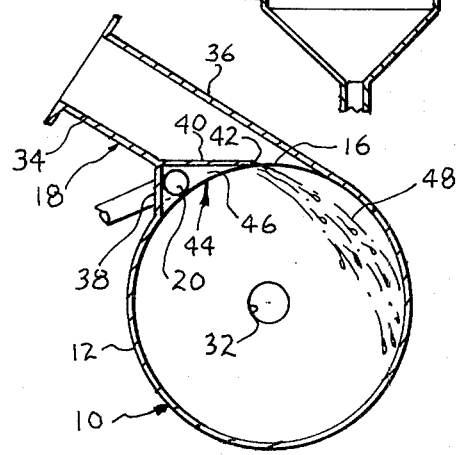
FIG. 2 is a sectional view taken along lines 2—2 of FIG. 1.

As shown in FIG. 2 the conduit 18 has a rectangular configuration including oppositely disposed vertical side walls 34 and 36. The side wall 36, at its juncture through the casing 12, merges smoothly and tangentially therewith. The side wall 34 is configured to have two diverging wall portions 38 and 40. The side wall 38 merges with the casing side wall and the wall 40 terminates at an edge 42 defining a side of the passage 16. The offset area between the walls 38 and 40 is a pocket area 44. The pocket area 44 is open to the interior of the chamber 14 and the water tube 20 is disposed within the pocket area 44. The pocket area 44 is further defined by the upper and lower horizontal wall portions or plate portions only one of which, 46, is clearly shown. The water discharge holes or nozzles 22 in the tube 20 are disposed to provide substantially parallel water streams against the wall 40 whereby a continuous water curtain is formed thereby in a tangential direction across the passage 16. This water curtain is generally illustrated in FIG. 2 and designated by numeral 48.

Referring again to FIG. 1, it will be seen that the area above the passage 16 in the chamber 14 is occupied by a plurality of vertically spaced-apart ring-like members or flats 50. Each of the ring-like members 50 has a circular configuration whereby the outer edge thereof is disposed contiguous to the inside surface of the chamber 14, and each ring-like member is interrupted therealong by a gap 52 define by spaced-apart ends 54 and 56. Each of the ring-like flats 50 has a helical configuration whereby, it slopes gradually downwardly around the chamber side wall such that the ends of each ring-like flat are disposed at different levels in the chamber.

Considering now the operation of the apparatus hereto broadly described, a gas flow having particulate matter entrained therein is conducted into the contacting chamber 14 from the conduit 18 through the passageway 16. The comparative narrowness of the passage 16 relative to the area within the conduit 18 serves to impart a high velocity to the gas whereby the gas flow whirls through the chamber at extremely high intensity. The water streams from the outlets 22 move across the wall 40 in a horizontal direction toward the passage 16. This water flow is intersected at the edge of the wall 40 both by the incoming gas flow and the flow whirling centrifugally through the chamber 14. The interaction of the gas flow with the water forms a water curtain (denoted by 48 in FIG. 2) made up of water droplets moving comparatively slower than the gas flow. These droplets, as they move across the chamber, are forced centrifugally toward the side wall of the chamber whereby they cross through the gas flow. The comparatively rapidly moving particles of matter carried in the gas flow impact against the slowly moving water droplets. The particles which impact with the water droplets tend to entrain on the surface of the droplets whereby the particles are separated from the gas flow. The separating effect is further enhanced because the centrifugal force continues to cause gas borne particles to move toward the side wall of the contacting chamber and into the water flow cascading around the wall.

While the foregoing action is taking place rinse water is being supplied to the chamber 14 by means of the tangentially oriented inlet tubes 26 and 28. The water flow from these tubes spirals downwardly through the chamber to create a rinsing flow against the chamber's inside surface. Particles carried in the gas flow spiraling upwardly in a direction countercurrent to the rinsing flow are forced centrifugally to the chamber's side wall whereby the particles are captured by the rinse water flow and moved downwardly through the contacting chamber 14.

The initial interaction of the incoming gas flow with the water curtain in the lower end of the contacting chamber 14, while it removes a high percentage of particles from the gas flow, is not sufficient to prevent a small portion of dust particles from being carried with the gas flow centrally upwardly as an axial flow through the chamber 14. Therefore, one or more water spray nozzles 58 are provided to discharge a downwardly directed outwardly diversioning water spray through the central portion of the chamber 14 and particularly through the zone of initial gas-water interaction as heretofore described. The water spray from the nozzle 58 has the further effect of reversing the central gas flow direction such that the path of least resistance for the gas flow is upwardly along the chamber's side wall where particles are centrifuged in the rinsing water.

Turning again to the area of chamber 14 directly above the initial interaction area, the ring-like members 50 located therein serve to materially increase the efficiency of the contacting chamber by enabling a relatively higher gas flow velocity than would be feasible or attainable in the absence of the ring-like members. As mentioned earlier in the background portion of this specification, separation efficiency is significantly increased by increasing the velocity of the gas flow therethrough. However, in the absence of the ring-like members 50 in the chamber 14, a gas flow of particularly high velocity will have the effect of counteracting the countercurrent rinse water flow such that the rinse water cannot progress downwardly due to the high force of gas flow. In this invention the gas flow is caused to move away from the vertical side wall of the chamber due to the presence of the ring-like members such that the gas and water flows in this part of the chamber do not impact directly. Thus, the spaced-apart ring-like members 50 serve as interference means to disrupt the continuity of the gas flow close to the vertical side wall of the chamber.

It has been found desirable to configure each of the ring-like members 50 to have a gap 52 defined by spaced-apart ends 54 and 56 and then dispose each member in a helical configuration to slope gradually downwardly in the direction of rinse water flow. This eliminates undesirable water build-up above the ring-like members and thereby tends to promote the desired flow of the downwardly spiraling rinse water through the contacting chamber 14.

Figure 3:
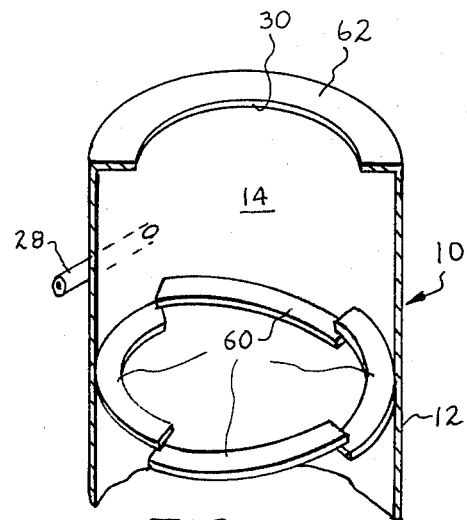
FIG. 3 is a fragmentary isometric view showing a cut-away portion of the upper end of apparatus in accordance with the present invention and illustrating an alternative embodiment for a particular component of the apparatus.
Figure 4:
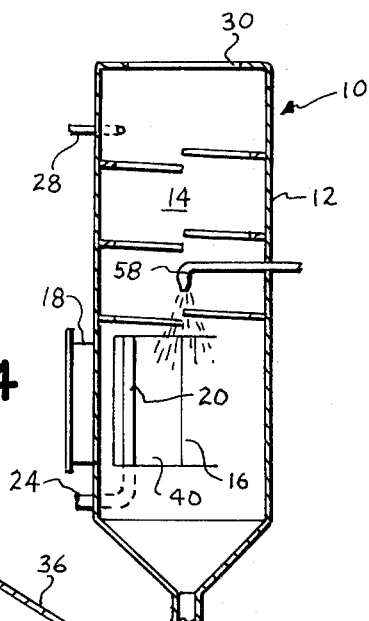
FIG. 4 is an elevational view in a vertical section, shown in reduced scale, illustrating apparatus of the present invention including a component therewith not illustrated in the other views heretofore described.

Referring to FIG. 3, an alternate embodiment for the flow interference means in the upper portion of the contacting chamber 14 comprises arcuate sections 60 disposed circumferentially within the chamber 14. This structure is considered equivalent to severing the rings 50 shown in FIG. 1 into substantially equal sections and then sloping each section as shown in FIG. 3 to serve as separate screw-like flats descending in the same direction as the rinse water flow. This arrangement serves to obtain the desired disruption of the upwardly spiraling gas flow while at the same time guiding the rinse water flow downwardly as desired. Utilization of sectionalized ring-like members as shown in FIG. 3 is particularly beneficial in apparatus wherein the diameter of the chamber 14 is substantially large. In such apparatus it is preferred that the rinsing water passes downwardly in more than one flow.

In known apparatus utilizing a cylindrical chamber to subject a gas flow to water contact, a large outlet or exhaust tube is often extended downwardly in the upper section of the chamber to form an annular pocket into which rinse water inlet tubes direct their flow initially. This downward descending outlet tube tends to shield the incoming rinse water from the direct effect of the high velocity gas flow at the upper end of the chamber. In this invention, use of the ring-like members 50 shown in FIG. 1 or the sections 60 shown in FIG. 3 not only serve to significantly increase the overall efficiency of such apparatus, but also have the advantage of obviating the need for the afore-described downwardly extending exhaust tube of the prior art. Due to the use and location of the ring-like members provided in this invention, a barrier, such as the aforementioned exhaust tube, is not required and the rinse means can include tangentially oriented tubes such as 26 and 28 disposed beneath a radially inwardly extending annular flange portion 62 thereabove as shown in FIGS. 1 and 3. The presence of the flange 62, in combination with one or more of the ring-like members 50 disposed downwardly below the area of incoming rinse water, is sufficient to prevent a directly upward and outward sweeping of the incoming rinse water by the rapidly moving gas flow being exhausted through the exhaust opening 30.

The foregoing description and accompanying drawings, which pertain primarily to the presently preferred embodiments of the present invention, are not intended to limit the invention since it will be obvious to those skilled in the art that various changes and modifications may be made without departing from the inventive concepts herein contained. It is therefore intended in the appended claims to cover all such changes and modifications that fall within the true spirit and scope of the invention.

I claim:

1. In apparatus for contacting gas flow with a liquid flow to remove particulate matter from the gas flow, of the type including a tubular casing having its major axis substantially vertically oriented and defining an interior contacting chamber first liquid inlet, means for introducing a liquid flow to the contacting chamber located adjacent the upper end of the chamber and adapted to provide a spiraling liquid flow downwardly against the inside chamber sidewall, a gas flow outlet means in flow communication with the upper end of the chamber above the first liquid inlet means for exhausting the gas flow after particulate matter has been substantially removed therefrom, discharge means including an opening in the lower end of the chamber adapted to discharge water with separated particulate matter, and gas flow inlet means located upwardly adjacent the discharge means and in flow communication with the chamber and tangentially oriented to direct the flow, received from an outside supply source, toward the inside chamber sidewall at a velocity whereby the gas flow is whirled centrifugally in a continuous upward spiral pathway through the chamber and toward the outlet means, second liquid inlet means located adjacent the gas flow inlet means and adapted to provide a water curtain across the incoming gas flow, the improvement therewith comprising means located entirely above the gas flow inlet means and contiguous to the inside chamber sidewall and adapted to effect the ascending gas flow by increasing its velocity in the area of the chamber substantially above the gas flow inlet means, including at least one ring-like member that is generally planar in cross-section and having the outer edge thereof contiguous to the inside chamber sidewall whereby the ring-like member projects radially-inwardly such that the ascending gas flow is forced to follow a slightly constricted central pathway as the flow whirls centrally upwardly therethrough, and the ring-like member having a gap defined by two spaced-apart ends thereof and a spiral configuratioan whereby one end thereof is at a lower level than the other.

2. The invention of claim 1, further comprising a plurality of the ring-like members disposed in a spaced-apart relation to each other and wherein at least one of the ring-like members comprises a plurality of discrete sections.

3. The invention of claim 1 further including a water discharge means located centrally in the chamber and above the level of the gas flow inlet means.

4. A method of improving the efficiency of removal of particulate matter from a gas flow in an apparatus wherein a gas flow is contacted with a liquid flow and the apparatus is of the type having a vertically elongated cylindrical contacting chamber, liquid flow inlet means in flow communication with the upper end thereof and a discharge means including an opening at the lower end thereof, gas flow outlet means in flow communication with the upper end thereof and located above the liquid flow inlet means, and a tangentially oriented inlet opening into the lower end of the chamber above the discharge means providing a gas flow to the chamber whereby the gas flow whirls centrifugally in a continuous upward spiral pathway therethrough to transfer particulate matter from the gas flow to the liquid flow, comprising the steps of:

locating and directing the liquid flow inlet means in such a manner that the flow therefrom spirals concentrically downwardly against the inside chamber surface, increasing the velocity of the gas flow in the area of the chamber above the gas inlet by utilizing a ring-like member as a substantially annular inwardly extending projection from the inside chamber sidewall, establishing the ring-like member above the tangentially oriented gas inlet to cause the upwardly moving gas flow to separate, above the ring-like member, from the chamber, sidewall, and establishing a water curtain across the gas inlet.

5. The invention of claim 4 comprising the additional step of using at least a second ring-like member projecting inwardly from the chamber side wall and spaced vertically a short distance from the first ring-like member.

* * * * *